Aug. 16, 1966     C. R. BISHOP     3,266,815
TORSION-FREE ARTICULATED VEHICLE SUSPENSION
Filed Dec. 14, 1964     11 Sheets-Sheet 1

FIG. 1.

INVENTOR.
CHARLES R. BISHOP
BY Beehler & Arant
ATTORNEYS

INVENTOR.
CHARLES R. BISHOP
BY Beehler & Arant
ATTORNEYS

Aug. 16, 1966 C. R. BISHOP 3,266,815
TORSION-FREE ARTICULATED VEHICLE SUSPENSION
Filed Dec. 14, 1964 11 Sheets-Sheet 3

INVENTOR.
CHARLES R. BISHOP
BY Beehler & Arant
ATTORNEYS

Aug. 16, 1966  C. R. BISHOP  3,266,815
TORSION-FREE ARTICULATED VEHICLE SUSPENSION
Filed Dec. 14, 1964  11 Sheets-Sheet 7

INVENTOR.
CHARLES R. BISHOP
BY Beehler & Arant
ATTORNEYS Aug. 16, 1966     C. R. BISHOP     3,266,815

TORSION-FREE ARTICULATED VEHICLE SUSPENSION

Filed Dec. 14, 1964     11 Sheets-Sheet 9

INVENTOR.
CHARLES R. BISHOP
BY Beehler & Arant
ATTORNEYS

Aug. 16, 1966    C. R. BISHOP    3,266,815
TORSION-FREE ARTICULATED VEHICLE SUSPENSION
Filed Dec. 14, 1964    11 Sheets-Sheet 10

INVENTOR.
CHARLES R. BISHOP
BY Beehler & Arant
ATTORNEYS

INVENTOR.
CHARLES R. BISHOP
BY Beehler & Arant
ATTORNEYS

United States Patent Office
3,266,815
Patented August 16, 1966

3,266,815
TORSION-FREE ARTICULATED VEHICLE
SUSPENSION
Charles R. Bishop, Garden Grove, Calif.; Muriel J.
Bishop, executrix of said Charles R. Bishop, deceased
Filed Dec. 14, 1964, Ser. No. 418,167
25 Claims. (Cl. 280—104)

The present invention relates to an articulated suspension for four-wheel vehicles, which equalizes the load among the four wheels of the vehicle and at the same time avoids the transmission of torsional stresses to either the pay load or the vehicle frame resulting from unevenness in the terrain being traversed.

The present application is a continuation-in-part of my prior co-pending application Serial No. 187,828, filed April 16, 1962; and is also a continuation-in-part of my prior co-pending application Serial No. 264,439, filed March 11, 1963; both of which are now abandoned.

Articulated suspensions for four-wheel vehicles have been known in the prior art, for example, that shown in U.S. Patent No. 812,037, issued February 6, 1906 to Hanson et al. However, such prior suspension systems have apparently had inherent limitations which rendered their use undesirable.

One object of the present invention is to provide an articulated, load equalizing suspension system for a four-wheel vehicle, which protects the load carried by the vehicle from substantially all torsional stresses resulting from unevenness in the terrain being traversed.

Another object of the invention is to provide a vehicle suspension of the foregoing type, which is economical to manufacture, quickly assembled and placed in usage, and quickly and easily disassembled.

A further object of the invention is to provide a self-powered vehicle capable of climbing high obstacles.

Yet another object of the invention is to provide a cargo trailer which is capable of entrained steering, such that a train of identical trailers can be guided around a curved path without any substantial departure from the course of the lead vehicle.

A further object of the invention is to provide an articulated vehicle suspension which operates with a maximum of efficiency and a minimum amount of wear upon its structural elements.

Yet a further object of the invention is to provide a vehicle suspension system for minimizing shifts which occur in the center of gravity of the vehicle and its load, as terrain irregularities are encountered.

Still another object of the invention is to provide a springless vehicle whose capability of absorbing road shocks is substantially equal to that of vehicles having conventional spring suspensions.

The above and other objects and advantages of the invention will be more readily understood from the following description considered in conjunction with the accompanying drawings, wherein.

Reference is now made to FIGURES 1 through 7 of the drawings illustrating one embodiment of the invention. The illustrated vehicle includes, generally, a rigid frame 10 upon which a load L is supported, a flexible frame 20, castors 31 to 34 carried by the flexible frame, and a towing tongue 30.

Figure 1:
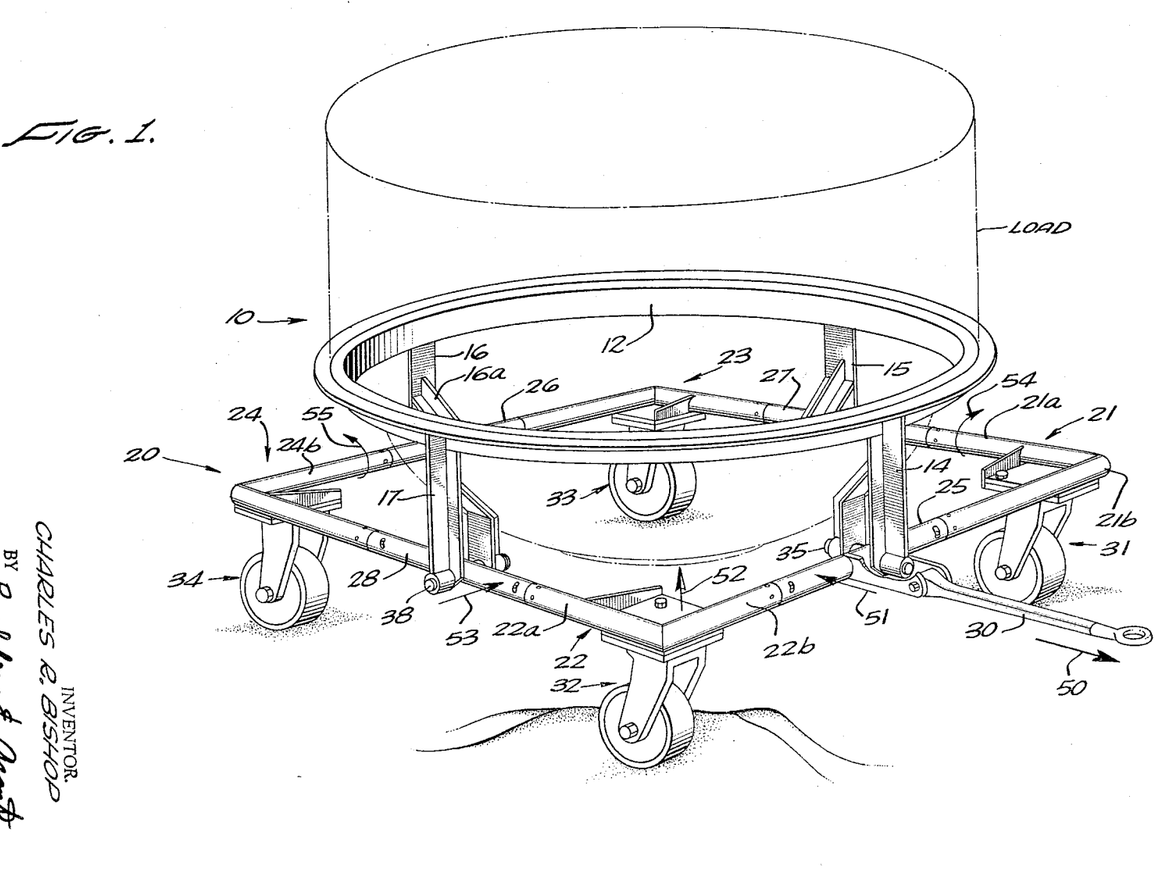
FIGURE 1 is a perspective view of one embodiment of the invention.

The load L may, for example, be the lower end of a heavy cylindrical body or drum of large size. The rigid frame 10 includes a metal ring 12 which supports the load L, and four vertical beams designated as 14–17 respectively, which extend vertically downward at equally spaced intervals around the circumference of the ring 12. Each vertical beam is bifurcated on its lower end, having a separate inner portion extending parallel to its main portion, and these inner portions are designated as 14a to 17a respectively.

The flexible frame 20 includes four cornerpieces, of which the left front cornerpiece is designated as 21, the right front cornerpiece as 22, the left rear cornerpiece as 23, and the right rear cornerpiece as 24. The flexible frame 20 also includes a transversely extending front end member 25 which couples the front cornerpieces 21 and 22 together, a rear end frame member 26 which couples the cornerpieces 23 and 24 together, a left side frame member 27 which couples the cornerpieces 21 and 23 together, and a right side frame member 28 which couples the cornerpieces 22 and 24 together. In the embodiment of FIGURES 1 to 7 both the corner pieces and the frame members are made of tubular sections, although the invention is not necessarily thus limited, as will be made apparent from the description of succeeding embodiments.

Figure 2:
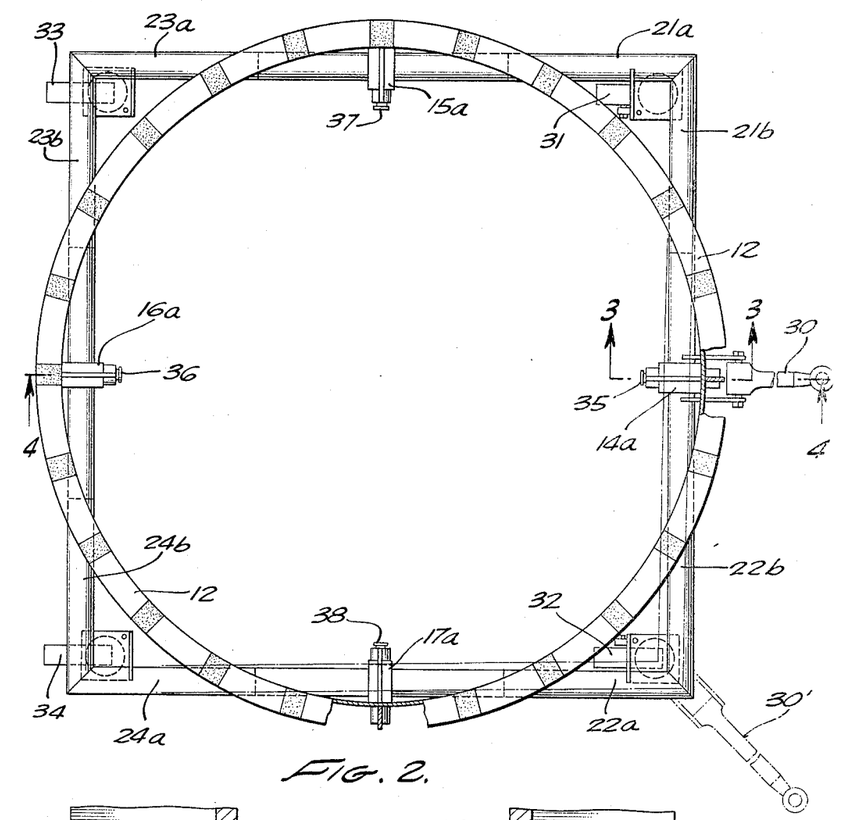
FIGURE 2 is a horizontal plan view, partially in section, of the vehicle of FIGURE 1.

The castors 31 to 34 are attached beneath the corner pieces 21 to 24, respectively, for supporting the flexible frame 20. The lower ends of the beams of the rigid frame are pivotally attached to the longitudinal centers of respective ones of the horizontal frame members of the flexible frame 20. Thus the lower end of beam 14 is attached to the center of frame member 25, the lower end of beam 15 is attached to the center of frame member 27, the lower end of beam 16 is attached to the center of frame member 26, and the lower end of beam 17 is attached to the center of frame member 28. These attachments are accomplished by means of horizontally disposed pins or trunnions designated as 35, 37, 36 and 38, respectively.

Figure 3:
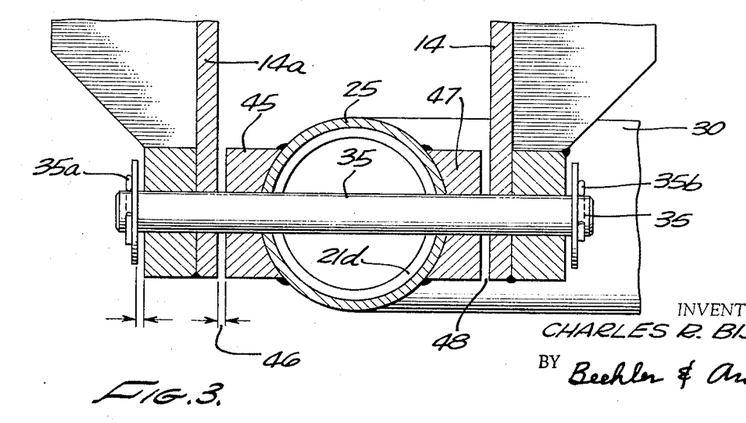
FIGURE 3 is an enlarged cross-sectional view taken on the line 3—3 of FIGURE 2.

Reference is now made more specifically to FIGURE 3 which illustrates the attachment of the lower end of beam 14 to the longitudinal center of frame member 25 by means of the trunnion 35. As shown in FIGURE 3 the left end of trunnion 35 is received in a cylindrical opening in the beam portion 14a, while the right end of the trunnion is received in a cylindrical opening of the main beam 14. The protruding left end of the trunnion is secured by a washer and cotter pin combination designated as 35a, while the protruding right end is secured by a washer and cotter pin combination designated as 35b. The tubular frame member 25 has circular openings formed in both its outer and inner walls so as to receive the trunnion 35. A metal buffer 45 is welded on the rear side of tube 25, and a similar metal buffer 47 is welded on to the front side of tube 25. The maximum horizontal extent between the outer faces of the buffers 45 and 47 is considerably less than the horizontal space between the inner faces of the beam 14 and beam portion 14a, with the result that horizontal spaces 46 and 48 exist adjacent buffers 45 and 47, respectively. These spacings are essential to the proper operation of the particular vehicle suspension assembly illustrated as will be subsequently explained.

The towing tongue 30 is attached to the flexible frame 20, and more specifically to frame member 25, and it therefore has no direct contact with the rigid frame. A fragmentary portion of the tongue 30 appears in FIGURE 3.

An essential characteristic of the flexible frame 20 is that the corner pieces are pivotally coupled to the respectively associated frame side and end members, so as to rotate relative thereto about the respective longitudinal axes thereof. Specifically, each corner piece such as 22 includes a pair of tubular sections 22a and 22b, each having one end cut at 45° and the two being secured as by welding or other suitable means so as to form an L-shaped configuration. A shorter tube 22c of smaller diameter is partially disposed within the outer end of tube 22a, as shown in dotted lines in FIGURE 4. A similar small tube, not specifically shown, is partially disposed within the outer end of tube 22b to extend outwardly therefrom. The portion of the smaller tube 22c that is contained within the larger tube 22a or 22b is secured by welds 60 of the rosette type. This arrangement is illustrated in FIGURE 5 specifically with regard to the small tube 24c which is attached within the outer end of tube 24a of the corner piece 24.

Figure 4:
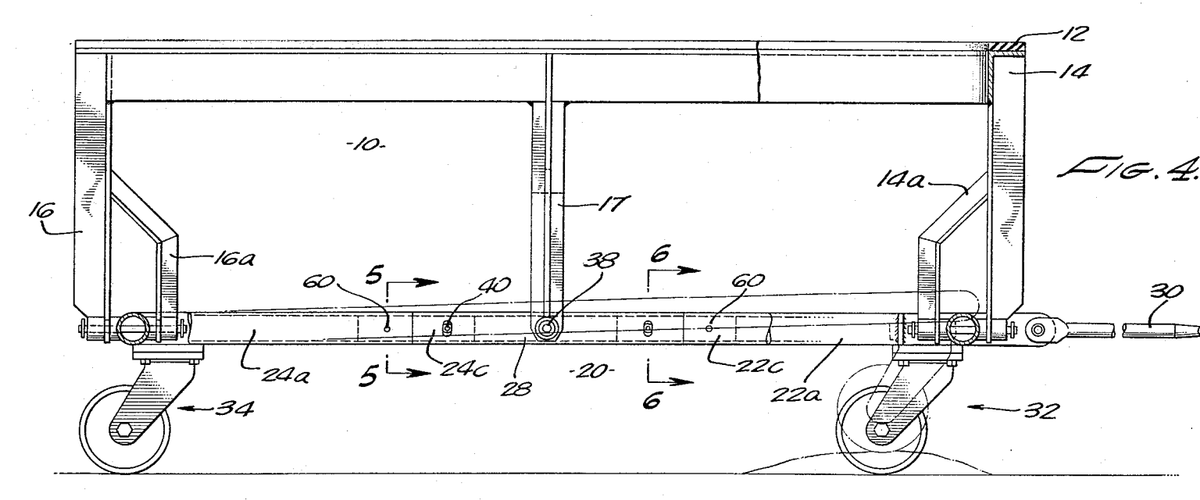
FIGURE 4 is a cross-sectional view taken on the line 4—4 of FIGURE 2.
Figure 5:
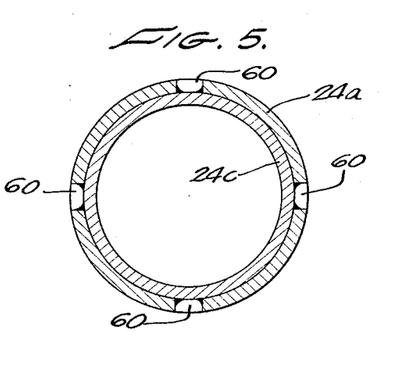
FIGURE 5 is an enlarged cross-sectional view taken on the line 5—5 of FIGURE 4.

As shown in FIGURE 4 the tubes 24c and 22c projecting from corner pieces 24 and 22, respectively, are received in the corresponding ends of the frame side tube 28. Side tube 28 is prevented from rotating by the trunnion 38, and the corner pieces 22 and 24 therefore rotate relative to the side tube 28, as the castors 32 and 34 move up and down while traversing uneven terrain.

The operation of the vehicle of FIGURES 1 to 7 is best explained with reference to FIGURE 1, and with particular regard to various arrows in FIGURE 1 which designate the motions of the various parts of the structure. Arrow 50 represents a forward pull on the vehicle by means of the towing tongue 30. Arrow 52 indicates that the corner piece 22 and its associated castor 32 move vertically up and down, as unevenness is encountered in the terrain that is being traversed. It is of course evident that the other corner pieces and their respectively associated castors likewise move up and down relative to each other as well as to the rigid frame 10. Arrow 54 indicates that there is a rotating motion of tube 21a of corner piece 21 relative to the associated frame side tube 27; and in similar manner the arrow 55 indicates there is a rotating motion of tube 24b of corner piece 24 relative to the frame rear end tube 26. The rotations of the tubes of the corner pieces relative to the side and end tubes of the flexible frame are, of course, a very small number of degrees. Arrow 51 indicates that there is some horizontal movement of the frame end tube 25 inward and outward relative to the lower ends of the beam 14, 14a; and in similar manner the arrow 53 indicates that there is some horizontal movement of the frame side tube 28 inward and outward relative to the beam 17, 17a.

Figure 6:
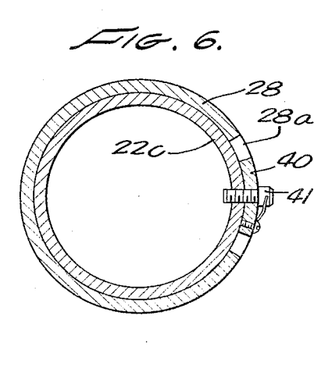
FIGURE 6 is an enlarged cross-sectional view taken on the line 6—6 of FIGURE 4.
Figure 7:
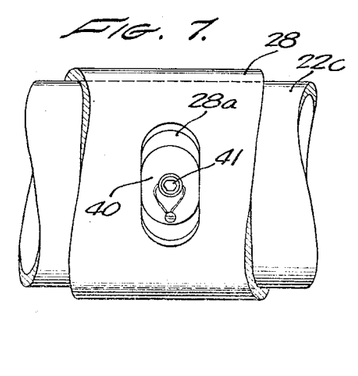
FIGURE 7 is an enlarged fragmentary view of a fastening arrangement utilized in the vehicle of FIGURE 1.

It has previously been pointed out that there is relative rotation between the tubes of the corner pieces and the side and end tubes of the flexible frame. The flexible frame also incorporates restraining means as specifically illustrated in FIGURES 6 and 7, and these restraining means prevent longitudinal movement of the side and end tubes either inward or outward relative to the associated corner pieces. With specific reference to FIGURES 6 and 7, 28a is an elliptical opening which is formed in the side of the side tube 28, and whose major axis is vertically aligned. 40 is an elliptical plug of the same minor diameter as the opening 28a, but whose major diameter is considerably smaller than the opening. 41 is a threaded bolt which secures the plug 40 in fixed relationship to the tube 22c that projects from corner piece 22. As tube 22c of the corner piece rotates relative to side tube 28, the plug 40 moves up and down, vertically, within the opening 28a. However, the tight longitudinal fit of the plug 40 in opening 28a prevents relative longitudinal movement between the tube 28 and the corner piece 22.

The effect of the restraining means in the embodiment of FIGURES 1 to 7 is to result in some horizontal inward movement of the corner pieces of the flexible frame, whenever they move either up or down. This horizontal movement of the corner pieces causes the gap 46 associated with the adjacent trunnions to become smaller while the gap 48 becomes larger.

Figure 8:
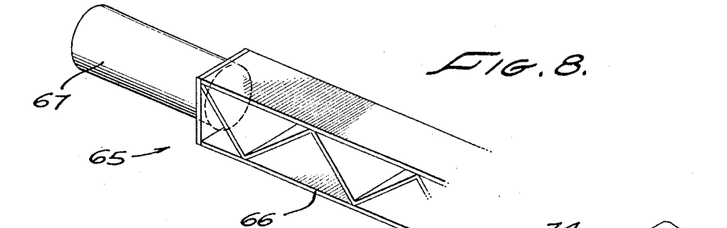
FIGURE 8 is a perspective view of an alternate form of frame member for the flexible frame.

Reference is now made to FIGURE 8 illustrating a frame member 65 which may be used in place of any one of the frame members 25, 26, 27 and 28 of the vehicle of FIGURE 1. The frame member 65 includes a trussed frame section 66 having two short tube sections 67 attached to the ends thereof. Only one end of the frame member 65 is illustrated in the drawing.

Figures 9, 10:
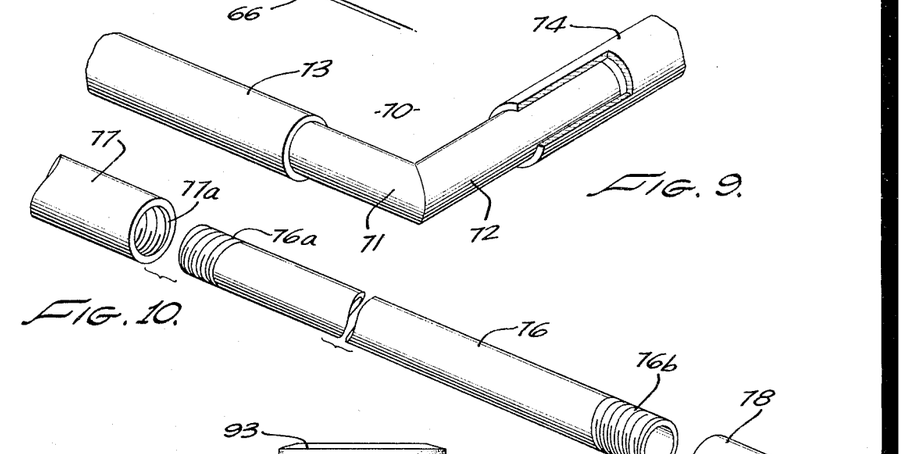
FIGURE 9 is a perspective view, partially cut away, of an alternate arrangement for coupling a corner piece of the flexible frame to the ends of the associated flexible frame members.
FIGURE 10 is a perspective view of another form of tubular flexible frame member, having threaded ends which engage threaded openings in the corner pieces.

Reference is now made to FIGURE 9 illustrating an alternate form of the corner piece and frame member construction for the vehicle of FIGURE 1. As shown in FIGURE 9 a corner piece 70 includes a tube section 71 and a tube section 72 which are cut at 45° angles on one end and secured together as by welding. A tube 73 forms one side of the flexible frame, the tube 73 being sufficiently larger in diameter than tube 71, so that the end of tube 71 is rotatably disposed inside the end of tube 73. A tube 74 forms the forward end frame member of the flexible frame, and is also of larger diameter than the tube 72, so that the end of tube 72 is rotatably received inside the end of tube 74. In accordance with later embodiments of the vehicle of the present invention, to be described subsequently, no restraining means are used in conjunction with the corner piece of FIGURE 9. It therefore follows that the tubes 71 and 72 may not only rotate within the tube 73 and 74, respectively, but may at the same time slide back and forth longitudinally relative thereto. This is evident from the partial cut away view of the interior of tube 74 as seen in FIGURE 9.

FIGURE 10 illustrates still another modified form of construction of the flexible frame 20. In FIGURE 10 the tubes 77 and 78 form portions of corresponding corner pieces of the flexible frame. A tube 76 is one of the side or end tubes of the flexible frame. Tube 76 is threaded at one end with a left hand thread 76a, and is threaded at the other end with a right hand thread 76b. Tube 77 of one of the corner pieces is interiorly threaded at 77a so as to receive the left hand thread 76a. Tube 78 is interiorly threaded, in a manner not shown, to receive the thread 76b. The longitudinal center of tube 76 is supported by one of the trunnions, such as 35, not specifically shown in FIGURE 10. As is evident, the effect of the threads is to accomplish a predetermined amount of longitudinal expansion or contraction of the corresponding end portion of the flexible frame, concurrently with the rotation of the associated corner piece relative to the longitudinal axis of the side or end tube.

Figures 11, 12:
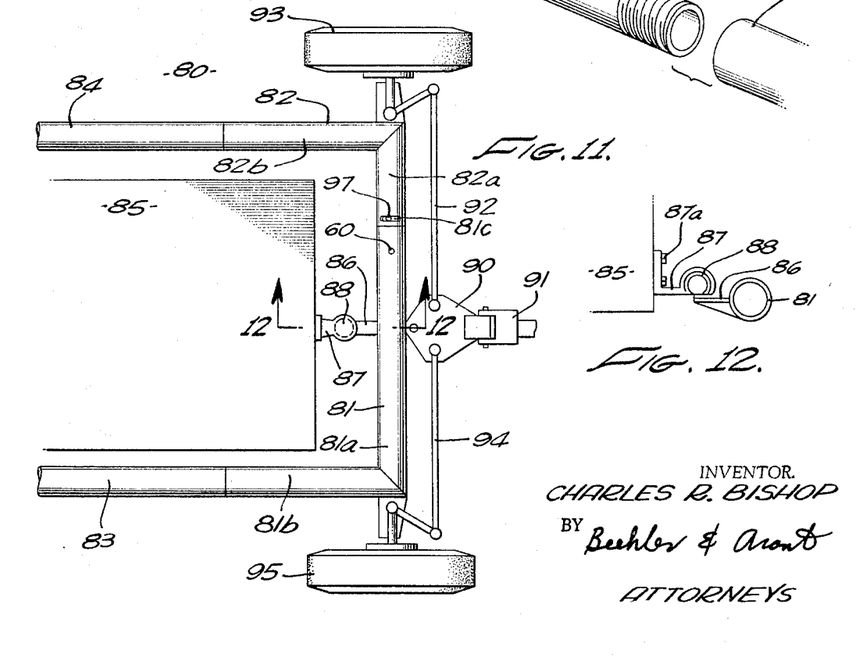
FIGURE 11 is a top plan view of the front end of another vehicle embodying the invention.
FIGURE 12 is a vertical cross-sectional view taken on the line 12—12 of FIGURE 11.

Reference is now made to FIGURES 11 and 12 illustrating a second form of vehicle provided in accordance with the present invention.

As shown in FIGURE 11 the vehicle 80 includes a rectangular rigid frame 85 to which is coupled a forward extending member 87 and ball joint coupling 88. The flexible frame includes, in addition to parts not shown, a left side tube 84, a right side tube 83, a left front corner piece 82, and a right front corner piece 81. Corner piece 81 includes a tube 81a which extends about three fourths of the distance across the front of the flexible frame, and a tube 81b which extends rearwardly, the joined ends of tubes 81a and 81b being cut at an angle of 45° and secured by welding or other suitable means. Corner piece 82 includes a tube 82a extending about one quarter of the way across the front of the flexible frame, and rearwardly extending tube 82b, which are joined together in the same fashion. A support member 86 extends rearwardly from tube 81a and provides support for one part (the ball) of the ball-and-socket joint 88. This last relationship is clearly shown in FIGURE 12.

The remainder of the vehicle of FIGURE 11, not shown, includes rear corner pieces and a rear end tube, and trunnions connecting the rigid frame to the longitudinal centers of the side tubes 83 and 84 as well as to the longitudinal center of the rear end tube. The ball and socket joint 88, it will therefore be seen, is used in lieu of a trunnion at the forward end of the rigid frame 85, and is also used in lieu of a rotating connection between the right front corner piece 81 and the associated forward end tube. As a matter of fact, in the embodiment of FIGURE 11 it will be seen that there is no forward end tube, but merely two corner pieces which are coupled together.

Tube 82a contains an elliptical opening, similar to opening 28a of FIGURE 6, in which is received a plug 97 similar to the plug 40 of FIGURE 6.

The plug 97 is secured to a smaller tube 81c, part of which is fastened inside the end of the tube 81a in the manner shown in FIGURE 5, and the remainder of which extends into the end of tube 82a.

The vehicle of FIGURE 11 also includes a forward steering plate 90 which is pivotally attached on the front side of the tube 81a, a towing tongue 91, a left steering bar 92 coupled from the steering plate 90 by conventional means to the left front wheel 93, and a right steering bar 94 coupled by conventional means from the steering plate 90 to the right front wheel 95.

FIGURE 11 illustrates the fact that a ball and socket joint such as 88 may be substituted for one of the trunnions such as 35 of FIGURE 1, and when so substituted also takes the place of one of the rotatable connections between a corner piece and associated end piece. Only two such substitutions of ball and socket joints for trunnions may be made, however, and at least two trunnions must always be used in the vehicle in accordance with the present invention.

Perhaps the most significant purpose of the present invention is to avoid the application of torsional stresses to the rigid frame or to the load carried thereby. In order to accomplish this purpose it is essential that torsional stresses arising in the flexible frame be relieved in the flexible frame itself, by means of appropriate joints or bearing mechanisms. The embodiment of FIGURE 11 carries out this purpose of the invention since the flexible frame is allowed to flex freely but without transmitting torsional stresses to the rigid frame.

An operational advantage of the vehicle of FIGURE 11 is that the bolts 87a associated with fastening device 87 may be removed from the rigid frame 85, the corner pieces 81 and 82 may be detached from side tubes 83 and 84, respectively, and the entire front end assembly of the vehicle may then be towed away as an integral unit.

Reference is made to FIGURES 13 to 25, inclusive, illustrating a third form of vehicle provided in accordance with the present invention.

Figure 18:
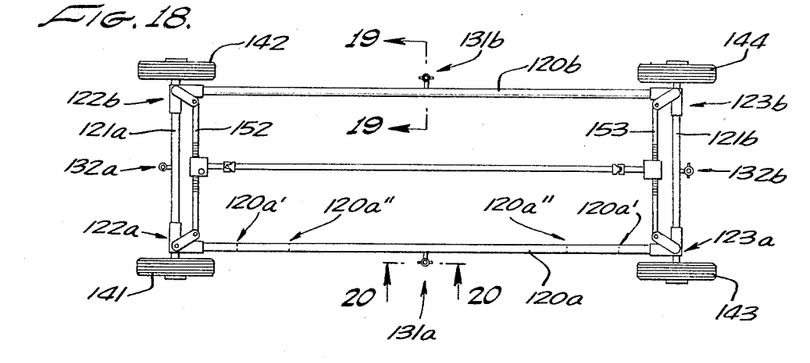
FIGURE 18 is a horizontal cross-sectional view of the vehicle of FIGURE 13, taken on the line 18—18 of FIGURE 14.

Referring now specifically to FIGURE 18, the longitudinal side member on the left side of the vehicle is designated as 120a, and that on the right side as 120b. The transverse member at the forward end of the vehicle is designated as 121a, and that at the rearward end as 121b. Corner pieces at the left front corner and right front corner of the vehicle are designated as 122a and 122b, respectively, while the rear corner pieces are designated as 123a and 123b, respectively.

Figure 21:
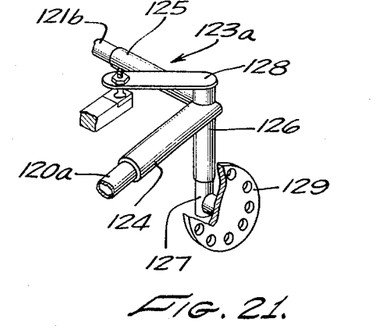
FIGURE 21 is a perspective view, partially in cross-section, of a corner piece and wheel mounting arrangement of the vehicle of FIGURE 13.

Referring now to FIGURE 21 illustrating the structural arrangement of corner piece 123a, it is seen to include a mutually perpendicular pair of tube stubs 124 and 125 which are disposed in the horizontal plane, having inner ends rigidly attached to each other and to a vertically extending wheel support tube 126. The side member 120a is of tubular form and has its rearward end rotatably received in the outer end of tube stub 124, while rearward end member 121b is also of tubular form and has its left end rotatably received at the outer end of tube stub 125. As also illustrated in FIGURE 21 a vertical rod 127 is rotatably disposed within the wheel support tube 126, having a steering rod 128 rigidly attached to its upper end, and having a fixed wheel base plate 129 rigidly supported from its lower end.

Figure 23:
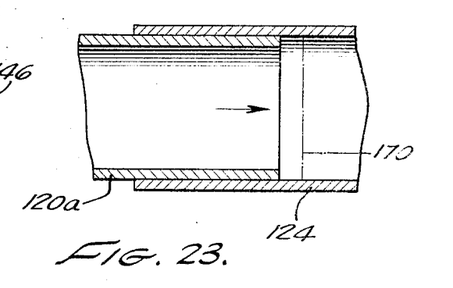
FIGURE 23 is an enlarged cross-sectional view of a detail of the flexible frame.
Figure 24:
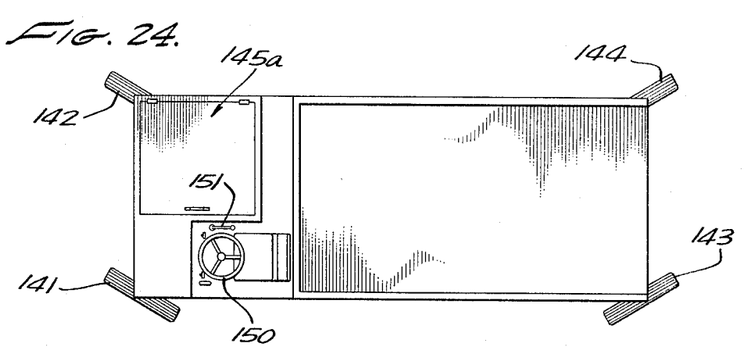
FIGURE 24 is a plan view of the vehicle of FIGURE 13 showing four-wheel steering actions.

The tubular construction of the flexible frame is preferred for at least two reasons. One reason is the reduced manufacturing cost. Another reason is that the flexible frame can be quickly and easily assembled or disassembled under field conditions. It will be noted that the side tubes 120a and 120b and end tubes 121a and 121b are not positively locked into the corner pieces, but are retained therein by means of attachments to the rigid frame, as will be described. During articulation of the flexible frame, as the vehicle travels over uneven terrain, there is a certain amount of reciprocation back and forth of the ends of the side and end tubes within the corner pieces. This end movement is illustrated in FIGURE 23 which shows one extreme position of the end of tube 121a in solid lines, and indicates its other extreme position within the tube 124 by means of a dotted line 170.

Figure 19:
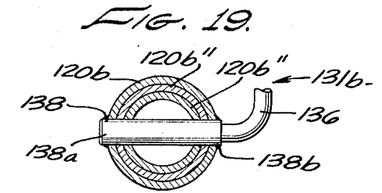
FIGURE 19 is a fragmentary cross-sectional view taken on the line 19—19 of FIGURE 18.
Figure 20:
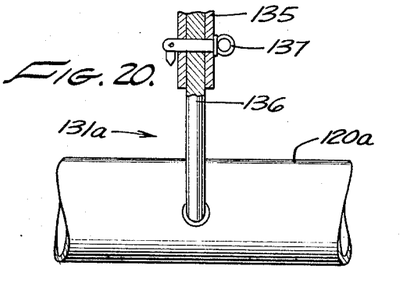
FIGURE 20 is a fragmentary cross-sectional view taken on the line 20—20 of FIGURE 18.

Rigid frame 130 is a box-like construction and has four fastening devices depending downwardly from the under surface thereof. Fastening devices 131a and 131b are located at the longitudinal centers of the left and right sides of the rigid frame, respectively, while fastening devices 132a and 132b are located at the transverse centers of the front and rear ends of the rigid frame, respectively. Referring to FIGURE 20 which illustrates the structure of the fastening device 131a, it will be seen to include a short tube section 135 depending downwardly from the rigid frame 130, an L-shaped rod 136 whose upper end is disposed within the tube section 135, and a bolt 137 passing through both the tube section 135 and the upper end of rod 136 for firmly locking them together. The lower end of rod 136 extends horizontally inwardly, beneath the rigid frame 130, and this arrangement is best seen by reference to FIGURE 19 illustrating the corresponding arrangement of fastening device 131b. As seen in FIGURE 19 the inner end of rod 136 of fastening device 131b is slidably received in a sleeve member 138 which passes through opposed side openings in the tube 120b. The inner end 138a of the sleeve member is capped but its outer end 138b is open. The sleeve member 138 is rigidly fastened to the tube member 120b, as by spot-welding. The end of rod 136 is inserted into the sleeve member 138 and provides a firm support which inhibits movement of the associated tube 120b in a horizontal direction outwardly from the frame 130.

In conjunction with the first embodiment of the invention illustrated in FIGURES 1 through 7, the retaining means including plug 40 and bolt 41 were described in detail and their operation explained. In this third embodiment of the invention illustrated in FIGURES 13 through 25 it will be apparent that the equivalent retaining means are provided by the rods 136. An inherent requirement of the present invention is that a certain amount of expansion and contraction of the flexible frame is necessary in order to achieve torsion-free transporation of the load. On the other hand, if the flexible frame is completely free to expand or contract, the result would be that it would fall apart. So it is apparent that retaining means are necessary in order to prevent the structure from falling apart, while at the same time permitting the expansion and contraction movement to occur to the extent that they are necessary to fulfill the purposes of the invention.

As also illustrated in FIGURE 19 the tube 120b has a smaller tube 120b prime concentrically disposed therein, and a still smaller tube 120b double prime disposed within the tube 120b prime. Tube 120b prime is shorter than tube 120b, tube 120b double prime is shorter than tube 120b prime, and the longitudinal centers of all three tubes coincide. Thus all three tubes are supported at their longitudinal centers by the permanently secured sleeve member 138. It will readily be seen that in this manner a spring arrangement is achieved, permitting the longitudinal center and the two ends of the side tube 120b to be flexibly supported relative to each other.

In a similar manner the tube 120a has consecutively smaller and shorter tubes 120a prime and 120a double prime concentrically disposed therein. The ends of these shorter tubes are indicated by appropriate dotted lines in FIGURE 18.

Figures 13, 15:
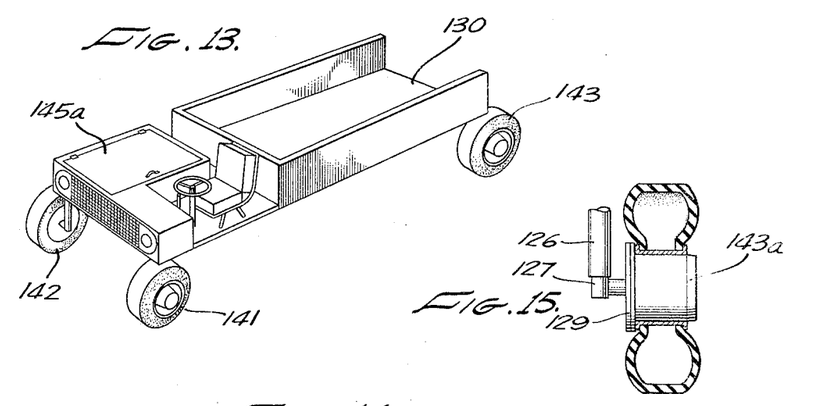
FIGURE 13 is a perspective view of a third vehicle embodying the invention.
FIGURE 15 is a fragmentary cross-sectional view taken on the line 15—15 of FIGURE 14.
Figure 14:
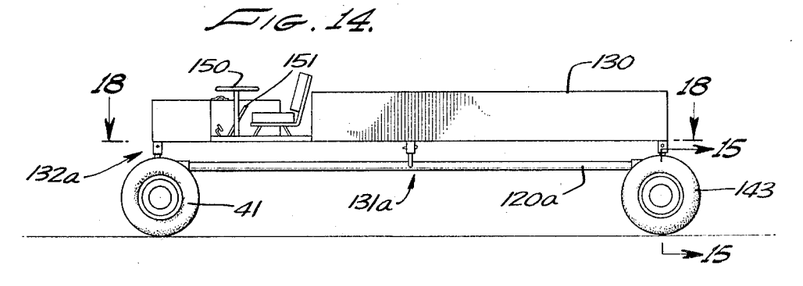
FIGURE 14 is a side elevational view of the vehicle of FIGURE 13.

The four wheels or tires of the vehicle are identified as 141 for the left front, 142 for the right front, 143 for the left rear, and 144 for the right rear, respectively. The wheels or tires are mounted upon respective motor units 141a, 142a, 143a and 144a. As shown in FIGURE 15 the motor unit 143a is supported from the corresponding fixed wheel base plate 129, and is rotatable relative thereto. The motor units are preferably of the type manufactured by the motorized wheel division of General Electric Co., 2901 East Lake Road, Erie, Pennsylvania. These motor units are traction-type, direct current, series wound machines.

Figure 22:
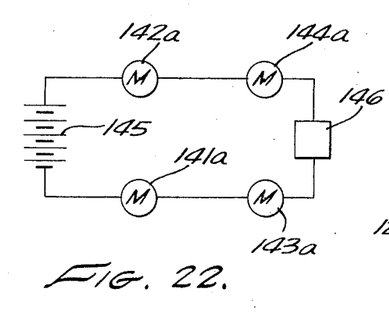
FIGURE 22 is an electrical schematic diagram of the drive system for the vehicle of FIGURE 13.

A battery 145 carried in a compartment 145a furnishes the motive power for the vehicle. Reference is now made to FIGURE 22 illustrating the arrangement of the electrical circuit. Motors 141a, 142a, 143a, and 144a are connected in a series loop circuit with each other as well as with the battery 145 and a control device 146.

The advantage of the illustrated type of arrangement is that driving power can be shifted from one wheel to another, wherever it is needed, without intervention by the operator. Specifically, when any one wheel of the vehicle encounters a steep obstacle, substantially all of the tractive power of the vehicle will be delivered to that particular wheel thereby enabling it to climb up and over the obstacle. It will, of course, be understood that whereas a differential drive system has been illustrated with electrical energization, the same character of operational results may be achieved with a differential drive system that is controlled by mechanical or hydraulic means.

Although the specific location of cables interconnecting the motor units with the control unit 146 and battery 145 has not been illustrated, it will be readily understood that they may be attached to the exterior surfaces of the side tube members or end tube members of the flexible frame, or if desired appropriate openings may be made in the tubular frame members which may then be used as electrical conduits for receiving the necessary cables.

One unique problem which may arise in the operation of the embodiment of the invention as disclosed in FIGURES 13 to 25 is that which may be encountered in climbing over a wall. It is possible that both front wheels of the vehicle may engage the wall simultaneously. Tractive power is then shifted from the rear wheels to the front wheels, but is divided between the two front wheels. In order to resolve this difficulty the vehicle is provided with rear wheel steering. By canting the rear wheels the operator can resolve the ambiguity as to which front wheel is to climb over the wall first. It will be readily understood that the same technique may be utilized whenever obstacles are encountered by any two of the wheels simultaneously, whether by both of the front wheels, both of the rear wheels, or one front wheel and one rear wheel.

Thus as best seen in FIGURE 18, the vehicle is provided with a front steering bar 152 and a separate rear steering bar 153. A steering wheel 150 is utilized in conjunction with a steering shift 151 for controlling either the front wheels, or the rear wheels, or both, as may be desired. The specific details of the steering shift mechanism need not illustrated as they are entirely conventional and form no part of the present invention.

Figure 16:
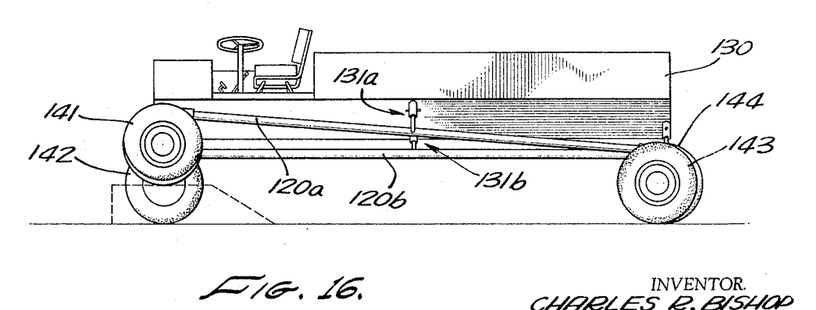
FIGURE 16 is a side elevational view of the vehicle of FIGURE 13 showing one wheel in a raised position.
Figure 17:
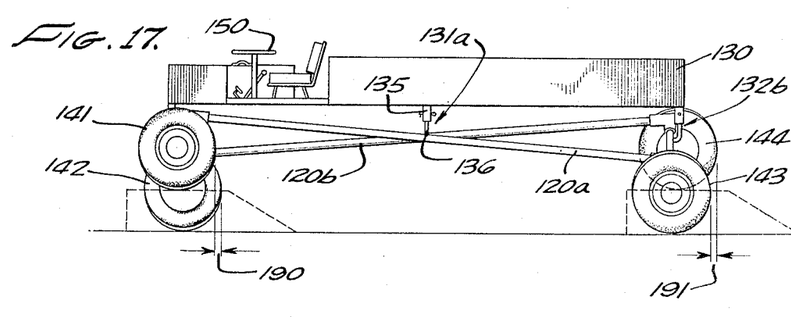
FIGURE 17 is a side elevational view of the vehicle of FIGURE 13 showing two wheels in raised positions.
Figure 25:
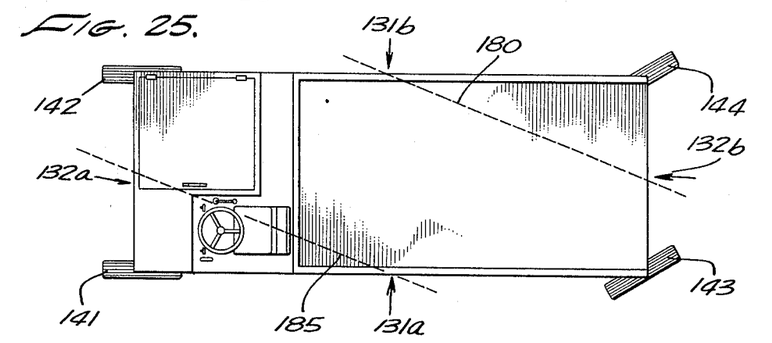
FIGURE 25 is a plan view of the vehicle of FIGURE 13 showing two-wheel steering action.

By referring to FIGURES 16, 17 and 25, the climbing action of the vehicle will be readily understood. Assuming that an obstacle encountered by the left front wheel 141 as illustrated in FIGURE 16 is 12″ high, it will be seen that upon elevating the left front wheel 12″ the fastening device 131a is elevated by 6″, and the fastening device 132a is also elevated by 6″. Fastening devices 131b and 132b are not elevated at all. Referring to FIGURE 25, it will be seen that the dotted line 180 represents the common axis of the fastening devices 131b and 132b which, in the given illustration would neither be raised nor lowered. Dotted line 185 represents the common axis of the fastening devices 131a and 132a which, in the illustration, were raised by 6″. It is therefore evident that, upon raising the left front wheel 141 by 12″ as shown in FIGURE 16, the left front corner of the rigid frame 130 of the vehicle would be raised only approximately 8″ to 9″. At the same time the right rear corner of the rigid frame of the vehicle, adjacent the wheel 144, would be lowered approximately 2″ to 3″.

Referring now to FIGURE 17, as there illustrated the left front wheel 141 is raised by 12″ and the right rear wheel 144 is raised by 12″, while the right front wheel 142 and left rear wheel 143 remain at ground level. From FIGURE 17 and the foregoing discussion it is apparent that, under these circumstances, all of the fastening devices are raised by 6″, and the entire rigid frame 130 of the vehicle is therefore elevated by 6″.

Thus a unique advantage of the present invention is that the various wheels of the vehicle may traverse relatively high objects with a comparatively smaller vertical movement of the main frame of the vehicle. Furthermore, the amount of shift of the center of gravity of the rigid frame 130 and its load is minimized.

An interesting feature of the operation of the invention is illustrated in FIGURE 17. As there shown, the left front wheel 141 when elevated above ground level moves a slight distance (designated 190) ahead of the right front wheel 142. Similarly, raising the right rear wheel 144 above ground level causes it to move a slight distance rearwardly of the left rear wheel 143 (distance designated 191). This operational feature results from the fact that the side and end tubes of the flexible frame are permitted to slide longitudinally within the corner pieces, as illustrated in FIGURE 23.

Other objects of the present invention, in addition to those previously set forth, are to provide a vehicle which is particularly adapted for entrained use, in that it is capable of precisely following the curved path of a preceding similar vehicle by which it is being towed; and to provide a vehicle which is selectively operable either to rotate in place, or to have its wheels set so as to provide static geometric breaking.

Figure 31:
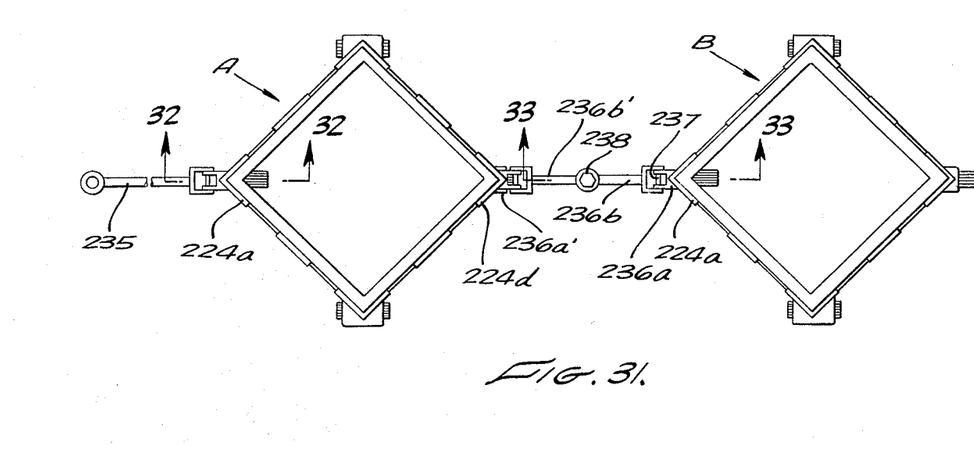
FIGURE 31 is a top plan view of still another embodiment of the invention.
Figure 32:
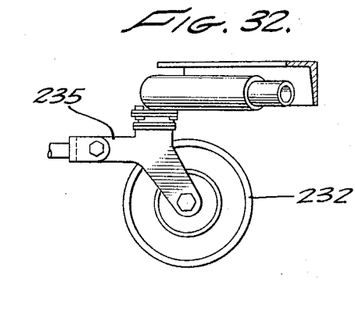
FIGURE 32 is an elevational view, partially in section, taken on the line 32—32 of FIGURE 31.
Figure 33:
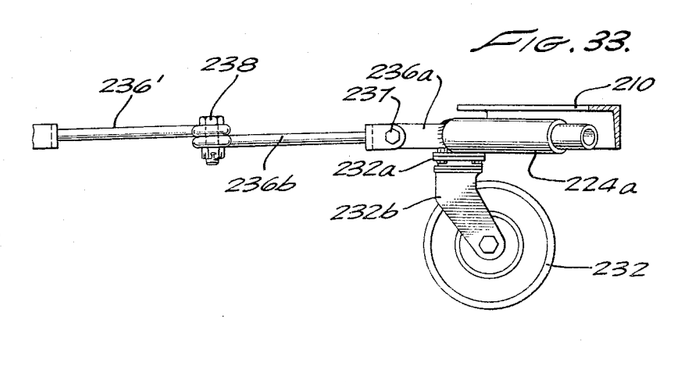
FIGURE 33 is an elevational view, partially in section, taken on the line 33—33 of FIGURE 31.

Reference is now made to FIGURES 26 to 37, inclusive, illustrating a fourth embodiment of the invention which is adapted to carry out these additional objects. A basic form of the invention is illustrated in FIGURES 26 to 30, inclusive; a somewhat modified version thereof is illustrated in FIGURES 31 to 33, inclusive; and a further modified form thereof is illustrated in FIGURES 34 to 37 inclusive.

Referring now to FIGURES 26 through 30, a rigid main frame 210 is adapted for load carrying purposes and has associated with it a flexible frame generally designated as 220. Included in the flexible frame 220 are tubular members 221a, 221b, 221c and 221d, which are of equal length and are arranged to form a square. Corner pieces 224a, 224b, 224c, and 224d each includes a pair of short tubular sections welded or otherwise secured together at right angles, thus providing a pair of mutually perpendicular cylindrical openings. Each corner piece rotatably and slidably receives the ends of the two associated ones of the tubular members 221.

Figures 26, 27, 28, 29, 30:
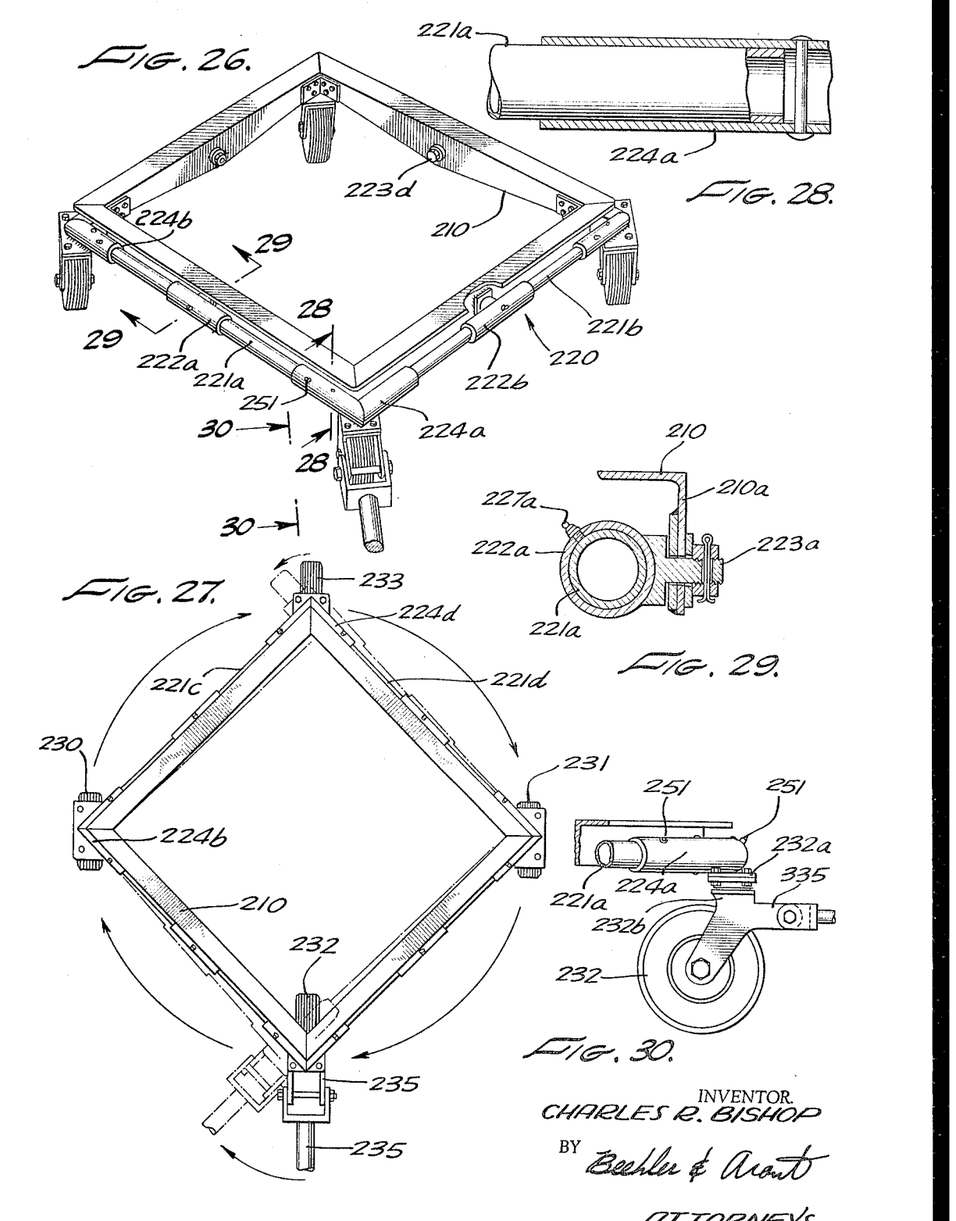
FIGURE 26 is a perspective view of a fourth embodiment of the invention.
FIGURE 27 is a top plan view of the embodiment of FIGURE 26.
FIGURE 28 is an enlarged cross-sectional view taken on the line 28—28 of FIGURE 26.
FIGURE 29 is an enlarged cross-sectional view taken on the line 29—29 of FIGURE 26.
FIGURE 30 is an elevational view, partially in section, taken on the line 30—30 of FIGURE 26.

Each of the tubular members 221 is received at its longitudinal center within a relatively short sleeve or housing 222, both the members 221 and housings 222 being rigid and preferably made of metal. An associated pivot pin 223 fastens the corresponding housing to the wall 210a of the rigid frame 210. As shown in FIGURE 29, the wall 210a is vertical and the pivot pin 223a is horizontally disposed therein, extending perpendicular to the sleeve 222a and being rigidly secured thereto so as to permit the sleeve or housing 222a to turn or rotate in a vertical plane. Tubular member 221a is longitudinally slidable within the sleeve 222a, as well as rotatable, and a grease fitting 227a provides for internal lubrication.

As shown in FIGURES 26 and 27 a corner piece 224a is located at the front of the vehicle, while corner piece 224d is at the rear. Corner pieces 224b and 224c are therefore disposed at laterally opposite sides of the longitudinal center of the vehicle. The corner pieces 224b and 224c carry fixed wheels 30 and 31, respectively, which in this embodiment of the invention are non-steerable relative to the frames 210 and 220. A front wheel 232 is supported from the corner piece 224a and is steerable, and a rear wheel 233 supported from the corner piece 224d is likewise steerable. More specifically, a castor base 232a is carried by the front corner piece 224a in fixed position relative thereto. A fork 232b is rotatably supported beneath the base 232a, and receives the front wheel 232. A towing tongue 235 is attached to the fork 232b and extends forwardly therefrom. The tongue 235 provides a means both for pulling and for steering the vehicle.

A castor base 233a is fixedly attached to the rear corner piece 224d, and a fork 233b rotatably supported from the base 233a receives the rear wheel 233. The configuration of the fork 232b and 233b is such that each of the wheels 232 and 233 is offset horizontally from its steering axis (the vertical axis of rotation of the associated fork), and by equal amounts. The structure and operation of the flexible frame 220 are such that whatever load is carried by the fixed or rigid frame 210 is transmitted in equal amounts to the four wheels of the vehicle, provided, that is, that the load is centrally symmetrically disposed upon the fixed or rigid frame 210. A result of this equal load distribution on the wheels is that, so long as the vehicle is resting upon a surface having uniform frictional characteristics, any turning of the front wheel 232 is accompanied by equal and opposite turning of the rear wheel 233. This steering movement is indicated in dotted lines in FIGURE 27, and is achieved by virtue of the fact that the steering movement imparted to the front wheel causes the frame to rotate about a vertical axis at its center, and this rotation of the frame produces an equal steering movement of the rear wheel.

Referring now to FIGURE 31, it will be seen that two vehicles A and B are coupled together in entrained relationship, with A being the lead or front vehicle and B the trailing or towed vehicle. The construction of the lead vehicle A is as shown in FIGURES 26 to 30, inclusive. More specifically, as shown in FIGURE 32 it will be seen that the front wheel 232 has a swivel castor support and an attached towing tongue 235, substantially identical to that shown in FIGURE 30.

The structure of the vehicle B is significantly different, however. As shown in FIGURE 33 the front wheel 232 of vehicle B has a swivel-castor support but no tongue attached thereto. Vehicle B has two fixed side wheels and swivel-castor front and rear wheels, just like the vehicle A. However, the connection of the tongue is to the front corner piece 224a rather than to the front castor. Thus as shown in FIGURE 33 the front wheel 232 is suspended from a fork 232b which is a portion of the front swivel castor. A tongue base 236a is rigidly secured as by welding to the front corner piece 224a and projects forwardly therefrom. A tongue 236b is coupled to the base 236a by means of a pivot pin 237 which is horizontally disposed, whereby the tongue 236b is permitted to pivot up or down relative to the front corner piece 224a but not in the horizontal plane. In similar manner a tongue base 236a prime is rigidly fastened to the rear corner piece 224d of the vehicle A, and has a tongue 236b prime pivotally coupled thereto. A vertically disposed pivot pin 238 connects the extremities of the tongues 236b and 236b prime, whereby a pivotal movement in the horizontal plane is obtained. It will be noted that the tongues 236b and 236b prime are of equal length.

In the operation of the embodiment shown in FIGURES 31 to 33, the towing tongue 235 of vehicle A is used both for towing and for steering, as previously explained. Any turning movement of the frame of vehicle A is imparted to its rear wheel and likewise to the tongue 236b prime at the rear end of the vehicle. Through the tongue 236b a turning movement is likewise imparted to the front wheel 232 of the towed vehicle B. It will readily be seen that with a train of vehicles coupled in the manner indicated, the second and each succeeding vehicle of the train will follow rather precisely in the path of the lead vehicle.

Figure 34:
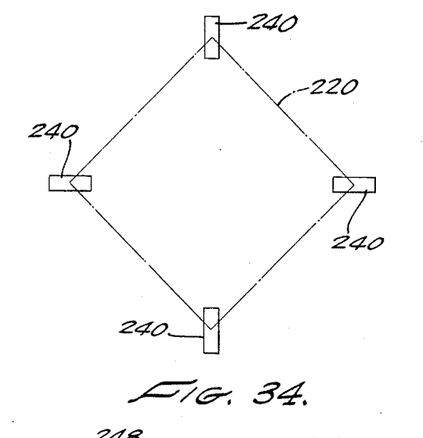
FIGURES 34 and 35 are schematic top plan views of further modified forms of the vehicle of FIGURE 26.
Figure 35:
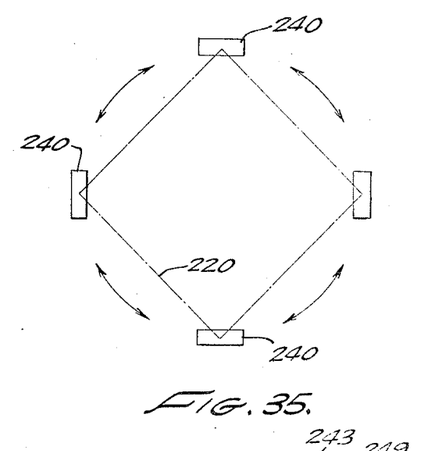
Figures 36, 37, 38, 39:
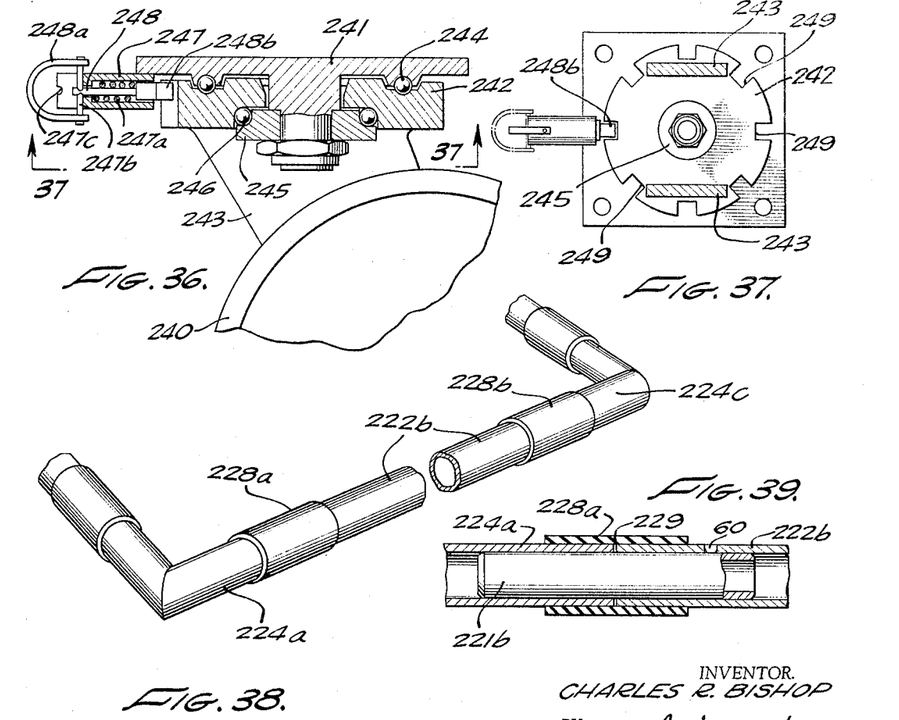
FIGURE 36 is an enlarged cross-sectional elevational view of the castor construction utilized in FIGURES 34 and 35.
FIGURE 37 is a cross-sectional view taken on the line 37—37 of FIGURE 36.
FIGURE 38 is a perspective view of another modified form of the flexible frame construction.
FIGURE 39 is an enlarged, fragmentary, longitudinal cross-sectional view of the flexible frame construction of FIGURE 38.

Reference is now made to FIGURES 34 to 37, inclusive, illustrating a further modified form of the vehicle of FIGURE 26. According to this form of the invention each of the four wheels of the vehicle is identical to all the others, and all of the wheels are selectively fastenable in various turning or rotation positions. Specifically, an eight-point locking castor is utilized as illustrated in FIGURES 36 and 37. The wheel 240 has associated with it a fixed castor base 241 and a rotating castor base 242. A parallel pair of arms 243 extends downward from the base 242 and provides a fork within which the wheel 240 is suspended. Ball bearings 244 in a suitable raceway facilitate the rotatable movement of the rotating base 242 relative to the fixed base 241. A locking nut for cap 245 is fastened to a central protruding portion of the fixed base 241, and has associated with it ball bearings 246 in a second raceway which also facilitate the rotatable movement of the rotatable base 242.

A latch housing 247 is attached to the fixed base plate 241 in one particular radial position thereof, as best seen in FIGURE 37. Within the latch housing 247 there is a latch plunger 248 having a handle 248a, and a forward or operative end 248b which selectively engages one of eight detents 249 formed in rotatable base 242. A coil spring 247a carried inside the latch housing 247 exerts a force on the latch 248 for normally maintaining its forward end 248b in engagement with one of the detents 249. The latch handle 248 is in the locked position as shown in FIGURE 36, and then occupies slots 247b in the latch housing 247. But in its unlocked position, the latch handle 248a is turned 90° relative to the longitudinal axis of the latch 248, and then engages notches 247c at the outer extremity of the latch housing 247. In this unlocked position of the latch the castor is freely rotatable in all directions. As is readily apparent from FIGURE 37 there are eight locking positions, separated by angles of 45°.

Utilizing the eight-points locking castors of FIGURES 36 and 37 it is possible to permit the vehicle to travel in any of several modes of operation, all of which are well known. It is also possible to lock the wheels in alignment with planes that are substantially radial to the center of the vehicle, as shown in FIGURE 34, in order to statically brake the vehicle so that it will not move from a given location. It is also possible to lock the wheels in positions tangential to the outer circumference of the vehicle, as shown in FIGURE 35, in order to adapt the vehicle for rotation in place. The geometric braking of FIGURE 34 has the advantage of simplicity and reliability, and eliminates the need for any separate type of brake device. Rotation in place as illustrated in FIGURE 35 is particularly convenient for various specialized types of applications.

Reference is now made to FIGURES 38 and 39 illustrating a further modification in accordance with the present invention. As shown in FIGURE 38 the sleeve or housing 222b is elongated so that it extends almost the entire distance between the corner pieces 224a and 224c. There remain a pair of gaps 229 (see FIGURE 39) between one end of the sleeve or housing 222b and corner piece 224a, and also between the other end of housing 222b and the corner piece 224c. Each of these gaps 229 is covered by a resilient housing section 228a. As best shown in FIGURE 39 the tubular member 221b and the rigid housing members 222b and 224a are made of metal, while the concentrically disposed resilient housing section 228a is made of rubber or similar material. The purpose of the gaps 229 is to take up the longitudinal sliding movement of the tubular member 222b (and its extension 221b) which necessarily results when one of the cornerpieces such as 224a moves significantly upwardly or downwardly relative to the other cornerpieces of the flexible frame 220. The advantage of the resilient housing sections is that by firmly securing them to the rigid housing sections, a completely dustproof and dirtproof housing is obtained, within which a suitable type of permanent lubricant may be employed so that the tubular members 221a, 221b, etc., are free to both rotate and slide inside the openings of their respective cornerpieces without interference by dust or dirt. Furthermore, in some applications of the vehicle of the present invention it is desired to move loads of highly combustible materials and to protect them from any source of sparks or friction, and for that purpose the complete enclosure of the mechanically operative portions of the vehicle is a distinct advantage.

Grease fittings such as 251 carried on the cornerpiece 224a may be advantageous, but are not necessarily required.

Figure 40:
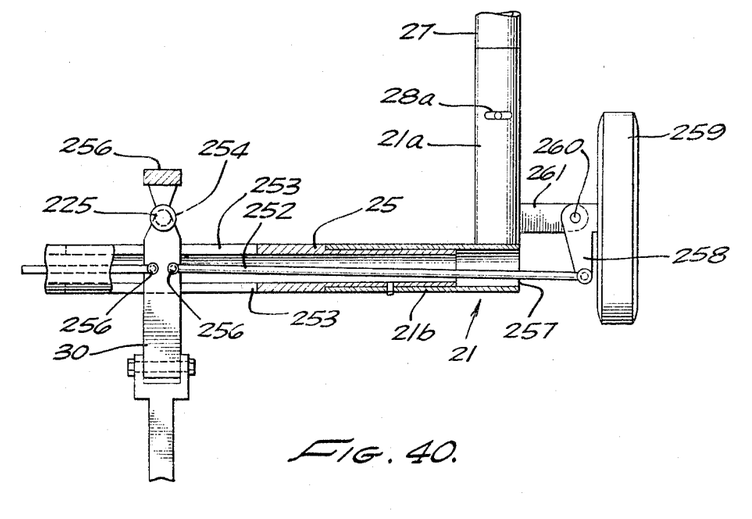
FIGURE 40 is a plan view, partially in section, of another steering arrangement.

In FIGURE 40 a modified embodiment of the invention is illustrated in which the steering tie rods 252 are housed within the tubular flexible frame 20, instead of disposed outside of it as in FIGURE 11. In this view the tubular frame 20 is substantially of the character illustrated in FIGURE 1 and includes the corner members generally designated 21 which has portions 21a and 21b, the cornerpieces 21a and 21b, respectively, rotatably receiving the adjacent ends of the side tube member 27 and front end tube member 25. The vehicle draw bar 30 extends through slotted openings 253 provided in the front and rear sides of the tube 25 and is provided with a ball cap 254 mounting over a ball joint 255 provided as on a dependent bracket 256 which is welded to the rigid frame 10. The tie rods 252 are pivotally connected as at 256 to the tow bar 30 and extend through openings 257 provided in the ends of the cornerpieces 21 and 22 (cornerpiece 21 only being shown in FIGURE 40). The tie rods 252 shown in FIGURE 40 connect to steering arms 258 which themselves connect to the wheels 259, and it will be observed that the steering arms 258 are pivoted as at 260 on brackets 261 which can be fixed to the cornerpiece 21a, as shown in FIGURE 40. The restraining connection 28a, 40 and 41 is the same connection shown in FIGURES 1–7. Steering movements of the tow bar 30 are transmitted via tie rods 252, which are in protected position within the tubular frame, to the steering arms 258 and wheels 259 in the usual manner. The slots 253 are of somewhat greater vertical dimension than necessary to pass the draw bar 30 so that the bar 30 does not interfere with the articulation of the flexible frame.

Figure 41:
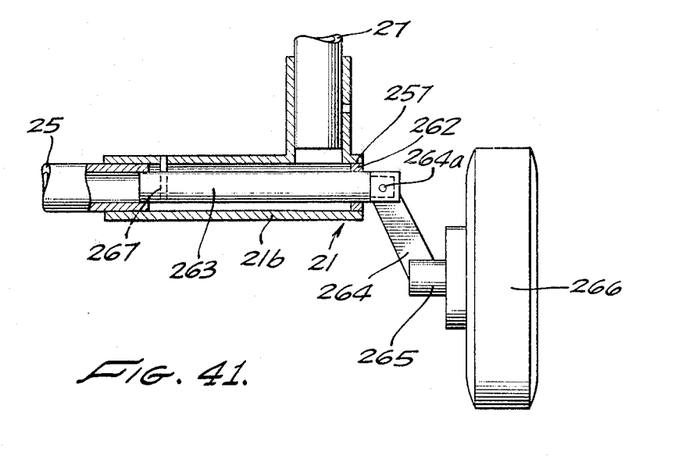
FIGURE 41 is an elevational view, partially in section, of a torsion-bar wheel support arrangement in accordance with the invention.

In FIGURE 41 another embodiment of the invention is shown in which the flexible frame 20 is of substantially the character of the flexible frame illustrated in FIGURES 1–7 and the cornerpieces 21–24 are each open at their corners to receive torsion shaft suspension members. FIGURE 41 is illustrative and shows the front section 21b of the front cornerpiece 21 as open at 257 to receive a bearing 262 which rotatably supports a torsion shaft 263 which may be pinned as at 264a to a crank-like arm 264 which is secured to the axle 265 on which wheel 266 revolves. The inner end of the torsion shaft 263 is pinned as at 267 to the cornerpiece 21 which similarly rotatably receives the sections 25 and 27.

Upward movements of wheel 266 due to road surface irregularities and the like are transmitted through the crank arm 264 and tend to rotate the outer end of torsion shift 263 relative to the inner end, which is pinned in fixed position as at 267, and the resistance to twist of the shaft 263 provides a torsion suspension system for the wheel 266. Torsion shafts are provided for each of the four wheels of the frame in the manner disclosed.

A significant characteristic of all the illustrated embodiments of the invention, when traversing rough surfaces at high speed, is that they successfully simulate the action of conventional spring-type vehicles. This spring action is made possible by the inherent resiliency of the side and end members of the flexible frame, resulting in a certain amount of bending of these members in response to road shocks.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:

1. A vehicle comprising, in combination: a flexible rectangular frame including four cornerpieces each having a pair of mutually perpendicular cylindrical openings therein, a pair of longitudinally extending side tubes each having a respective end thereof received in one opening of a corresponding one of said cornerpieces, a pair of transversely extending end tubes each having a respective end thereof received in one opening of a corresponding one of said cornerpieces, a pair of transversely extending end tubes each having a respective end thereof disposed within the other opening of a corresponding one of said cornerpieces, said ends of said side tubes and said end tubes being rotatable relative to said cornerpieces;
four wheels carried by respective ones of said cornerpieces and adapted to support said vehicle for longitudinal movement;
a rigid frame;
and means pivotally connecting the longitudinal center of each of said side tubes and each of said end tubes to corresponding separate points on said rigid frame whereby said cornerpieces of said flexible frame are permitted to move up and down relative to said rigid frame and to each other.

2. A vehicle as claimed in claim 1 which further includes fastening means cooperatively associated with said pivotal connecting means, for inhibiting excessive horizontal separation between said pair of side tubes or between said pair of end tubes.

3. A vehicle as claimed in claim 1 wherein at least two of said tubes have shorter and smaller hollow tubes disposed interiorly thereof and in engagement with the interior cylindrical surface thereof.

4. A vehicle as claimed in claim 3 wherein said pivotal connecting means are also attached to the longitudinal centers of said interiorly disposed tubes.

5. A vehicle comprising, in combination: a flexible rectangular frame including four cornerpieces each having a pair of mutually perpendicular cylindrical openings therein, a pair of longitudinally extending side members having cylindrical ends and each having a respective end thereof received in one opening of a corresponding one of said cornerpieces, a pair of transversely extending end members having cylindrical ends and each having a respective end thereof disposed within the other opening of a corresponding one of said cornerpieces, said ends of said side members and said end members being rotatable relative to said cornerpieces;
four wheels carried by respective ones of said cornerpieces and adapted to support said vehicle for longitudinal movement;
a rigid frame;
and means pivotally coupling the longitudinal center of each of said side members and each of said end members to corresponding separate points on said rigid frame whereby said cornerpieces of said flexible frame are permitted to move up and down relative to said rigid frame and to each other without applying torsion to said rigid frame.

6. A vehicle as claimed in claim 5 which is adapted for one-wheel steering, wherein said flexible frame is square, a pair of said wheels at diametrically opposite corners of said flexible frame are fixedly disposed in parallel relationship to each other, the remaining pair of said wheels are supported on swivel casters attached to respective ones of said cornerpieces, and which further includes means for applying a steering force to one of said casters.

7. A vehicle as claimed in claim 5 which is adapted for entrained steering, wherein said flexible frame is square, a pair of said wheels at diametrically opposite corners of said flexible frame are fixedly disposed in parallel relationship to each other, the remaining pair of said wheels are supported on swivel casters attached to respective ones of said cornerpieces, and which further includes a tongue having its inner end coupled in vertically pivoted relationship to one of said last-named cornerpieces and its outer end adapted for horizontally pivoted attachment to the tongue of another identical vehicle.

8. A vehicle as claimed in claim 5 which includes wheel support means that is selectively operable either for permitting at least two of said wheels to turn for steering said vehicle, or for locking all of said wheels in planes substantially radially disposed to the vehicle center for the purpose of static braking.

9. A vehicle as claimed in claim 5 which further includes four elongated rigid housings each circumdisposed about a corresponding one of said side and end members, and eight flexible housings each coupled between an end of one of said rigid housings and the associated one of said cornerpieces.

10. A vehicle as claimed in claim 1 wherein the cornerpieces associated with one of said end tubes each includes a transversely extending tube whose inner end rotatably receives the adjacent end of the associated one of said transversely extending end members, the outer end of said tube being open; and which further includes a wheel-attachment member disposed within said tube and projecting from said open end thereof.

11. A vehicle as claimed in claim 10 wherein said wheel-attachment member is a steering rod for guiding the associated wheel.

12. A vehicle as claimed in claim 10 wherein said wheel-attachment member is a torsion bar for springably supporting the associated wheel.

13. A vehicle as claimed in claim 5 wherein at least one of said cornerpieces includes a transversely extending tube whose inner and outer ends are open, and a wheel-attachment member disposed within said tube and projecting from said open outer end thereof.

14. A vehicle as claimed in claim 13 wherein said wheel-attachment member is a steering rod for guiding the associated wheel.

15. A vehicle as claimed in claim 13 wherein said wheel-attachment member is a torsion bar for springably supporting the associated wheel.

16. A vehicle comprising:
a flexible, rectangular frame including four angular cornerpieces, a first pair of generally parallel members substantially spanning said cornerpieces, a second pair of generally parallel members extending perpendicularly to said first pair and substantially spanning said cornerpieces;
ground engaging members carried by said cornerpieces and adapted to support said vehicle for longitudinal movement;
a rigid frame;
and means pivotally connecting the center of each member of said first pair of members and each member of said second pair of members to said rigid frame;

certain of said cornerpieces and members having bearing openings and certain of said cornerpieces and members having bearing portions rotatably received therein to engage said bearing openings so that certain ends of said first pair of members and said second pair of members are rotatable relative to said cornerpieces whereby at least certain of said cornerpieces of said flexible frame are permitted to move up and down relative to said rigid frame and to each other.

17. A vehicle according to claim 16 wherein said ground engaging members are wheels.

18. A vehicle comprising:
a flexible, rectangular frame having four sides and made up of four angular cornerpieces having generally perpendicular legs, a pair of generally parallel members substantially spanning generally parallel legs of said cornerpieces to form two generally parallel sides, the remaining two sides comprising other legs of said cornerpieces, and means pivotally connecting the other legs for relative rotation;
ground engaging members carried by said cornerpieces and adapted to support said vehicle for movement along the ground;
a rigid frame;
means pivotally connecting the center of each member of said pair of members to said rigid frame;
and means pivotally connecting at least one of the other sides of said flexible frame to said rigid frame at substantially the center of said one of the other sides;
certain of said cornerpieces and members having bearing openings and certain of said cornerpieces and members having bearing portions rotatably received within the said openings to engage said bearing openings so that certain ends of said members are rotatable relative to said cornerpieces and said cornerpieces of said flexible frame are permitted to move up and down relative to said rigid frame and to each other.

19. A vehicle comprising:
a generally rectangular flexible frame having four sides and including four corner assemblies;
two generally parallel sides of said frame comprising the corner assemblies and a pair of spaced apart, generally parallel frame members extending on lengthwise axes between said corner assemblies;
the other two sides of said frame comprising said corner assemblies and means connecting them for relative rotation;
ground engaging members carried by said corner assemblies and adapted to support said vehicle for movement along the ground;
a body to be supported by said flexible frame;
means pivotally connecting each of said frame members to said body intermediate the ends of said frame members;
and means also otherwise supporting said body so that said frame members pivot with respect thereto when one of said corner assemblies is raised with respect to another;
certain of the frame members and corner assemblies having axial bearing openings and certain of the frame members and corner assemblies having axial bearing portions received within said openings to rotate about the lengthwise axes of said frame members so that said frame members are axially rotatable relative to said corner assemblies and certain of said corner assemblies are permitted to move up and down relative to said body and to each other.

20. The combination defined in claim 19 in which said means connecting said corner assemblies for rotation on one of said remaining sides comprises an end portion on one of said corner assemblies received by an end portion of the other corner assembly comprising the said one of said remaining sides.

21. The combination defined in claim 19 in which said means connecting said corner assemblies for rotation on one of said remaining sides comprises a frame member extending on a lengthwise axis between and rotatably coupled to said corner assemblies forming the said one of said remaining sides for relative rotation therewith about its lengthwise axis.

22. The combination defined in claim 19 in which each of said frame members is permitted a limited movement along its pivotal connection to said body in a direction transverse to the lengthwise axis of each frame member.

23. The combination defined in claim 19 in which at least one of said cornerpieces includes a tube extending transversely to the said lengthwise axes and whose ends are open;
and in which a ground engaging member attachment member is provided within said tube and projecting from one of the open ends thereof to attach to one of the ground engaging members.

24. A vehicle adapted to travel over a surface comprising:
a generally rectangular flexible frame having four sides and including four corner assemblies;
two generally parallel sides of said frame comprising the corner assemblies and a pair of spaced apart, generally parallel frame portions extending between said corner assemblies and having end portions, extending on lengthwise axes, connecting with said corner assemblies;
the other two sides of said frame comprising said corner assemblies and means connecting them for relative rotation;
surface engaging members carried by said corner assemblies and adapted to support said vehicle for movement along a surface;
a body to be supported by said flexible frame;
means pivotally connecting each of said generally parallel frame portions to said body intermediate the ends of said frame portions;
and means also otherwise supporting said body so that said frame portions pivot with respect thereto when one of said corner assemblies is raised with respect to another;
certain of the said end portions of the said frame portions and corner assemblies having axial bearing openings and certain of the said end portions and corner assemblies having axial bearing portions received within said openings to rotate about the lengthwise axes of said end portions so that said corner assemblies are axially rotatable relative to said end portions and are permitted to move up and down relative to said body and to each other.

25. The combination defined in claim 24 in which said means also otherwise supporting said body comprises ball joints means connecting one of said corner assemblies with said body near the center of one of the said remaining sides.

References Cited by the Examiner

UNITED STATES PATENTS

| | | | |
|---|---|---|---|
| 1,066,712 | 7/1913 | Cooper | 280—104 |
| 1,946,293 | 2/1934 | Rosenthal | 180—60 |
| 3,001,798 | 9/1961 | Logan | 280—104 |
| 3,162,464 | 12/1964 | Woolslayer | 280—104.5 |

BENJAMIN HERSH, *Primary Examiner.*

P. GOODMAN, *Assistant Examiner.*